United States Patent [19]
Kaneko et al.

[11] 3,857,581
[45] Dec. 31, 1974

[54] SAFETY BELT DEVICE FOR VEHICLES
[75] Inventors: Yuichiro Kaneko; Fuminori Teraoka; Tatsushi Kubota; Takehiko Nishikawa, all of Aichi, Japan
[73] Assignee: Kabushiki-Kaisha Tokai-Rika-Denki-Seisakusho, Nishikasugai-gun, Japan
[22] Filed: Oct. 26, 1972
[21] Appl. No.: 300,976

[30] Foreign Application Priority Data
Nov. 4, 1971 Japan................................ 46-87869

[52] U.S. Cl............................................ 280/150 SB
[51] Int. Cl............................................. B60r 21/10
[58] Field of Search.................. 280/150 SB; 180/82

[56] References Cited
UNITED STATES PATENTS
| | | | |
|---|---|---|---|
| 3,679,229 | 7/1972 | Weststrate.................... | 280/150 SB |
| 3,684,310 | 8/1972 | Weststrate.................... | 280/150 SB |
| 3,700,258 | 10/1972 | Wize............................ | 280/150 SB |
| 3,727,944 | 4/1973 | Wize............................ | 280/150 SB |

Primary Examiner—Robert R. Song
Attorney, Agent, or Firm—Stevens, Davis, Miller & Mosher

[57] ABSTRACT

A safety belt device for use in a vehicle, having a safety belt extended across a seat with the opposite ends thereof secured to a door adjacent to the seat and the body of the vehicle respectively through a winding mechanism or an anchor plate, a tape or wire connected at one end to the safety belt and safety belt winding energy accumulator unit to which the other end of the tape or wire is connected, the energy accumulator unit being operated either mechanically or electrically to accumulate a safety belt drawing energy incident to the opening and closing operations of the door and releasing the accumulated energy when a passenger is seated on the seat, whereby the safety belt is automatically engaged around the body of the passenger to restrain the same.

4 Claims, 10 Drawing Figures

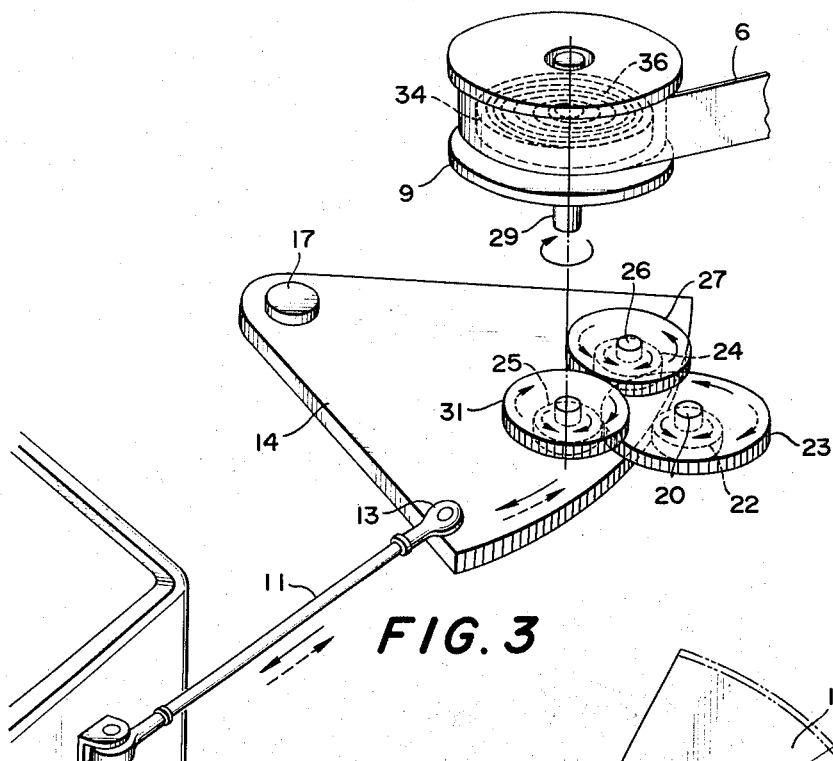
FIG. 3
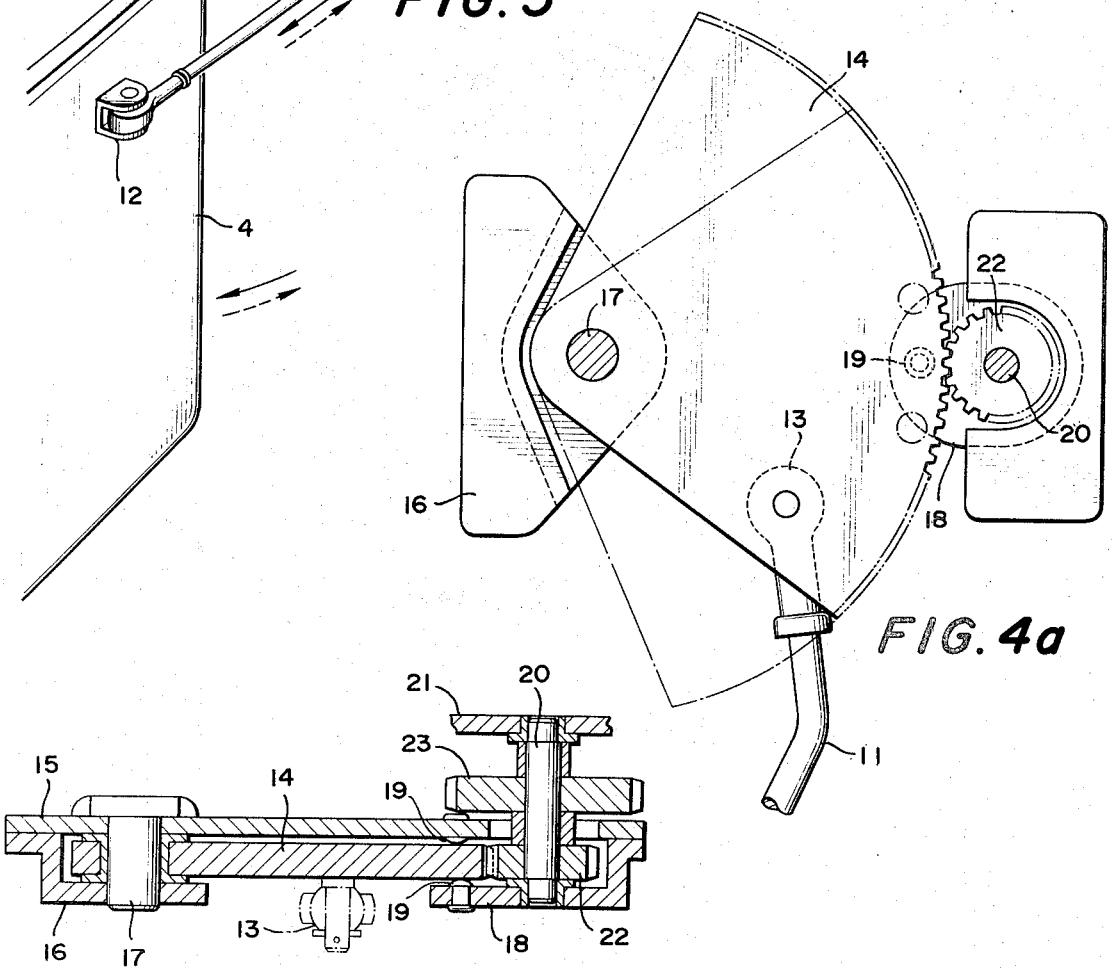
FIG. 4a
FIG. 4b

SAFETY BELT DEVICE FOR VEHICLES

BACKGROUND OF THE INVENTION

This invention relates to a safety belt device for use in vehicles.

SUMMARY OF THE INVENTION

The object of the present invention is to provide a safety belt device for use in vehicles, which is so designed that a safety belt is automatically engaged around the body of a passenger to restrain the same when the passenger is seated on a seat and closed a door, and is taken up in a safety belt winding energy accumulator to release the passenger from restrainment when the passenger has opened the door to get out of the vehicle.

BRIEF DESCRIPTION OF THE DRAWINGS

FIG. 3 is a perspective view for explaining the belt driving portion;

FIG. 4 is a set of views showing the construction of the driving portion, in which FIG. 4(a) is a plan view and FIG. 4(b) is a sectional view;

FIGS. 5 and 6 are views showing the construction of the energy accumulator unit, of which FIG. 5 is a plan view and FIG. 6 is a sectional view;

DESCRIPTION OF THE PREFERRED EMBODIMENTS

Figure 1:
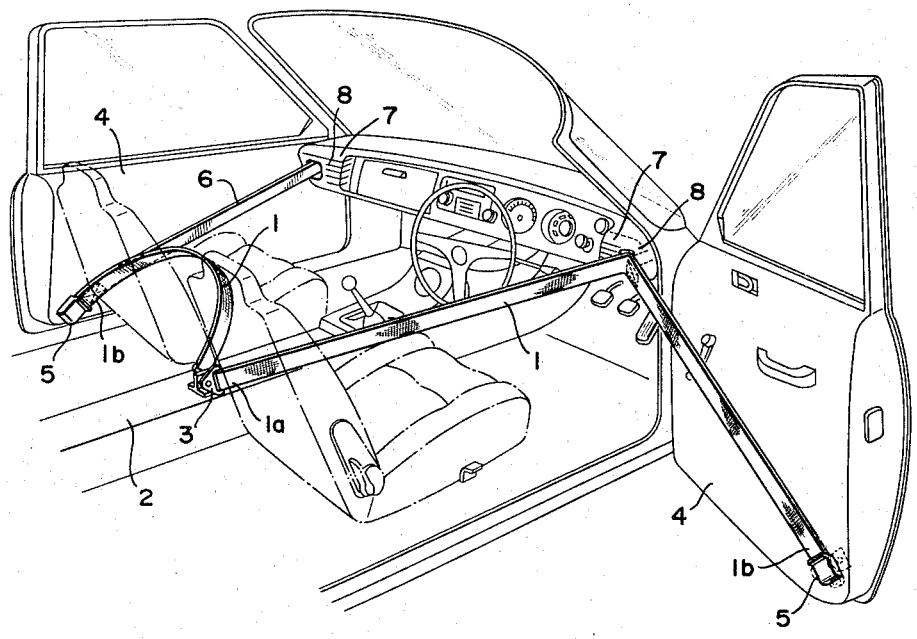
FIG. 1 is a fragmentary perspective view of a vehicle equipped with the safety belt device according to the present invention, with a door adjacent a driver's seat being opened and a door adjacent an assistant driver's seat being closed.
Figure 2:
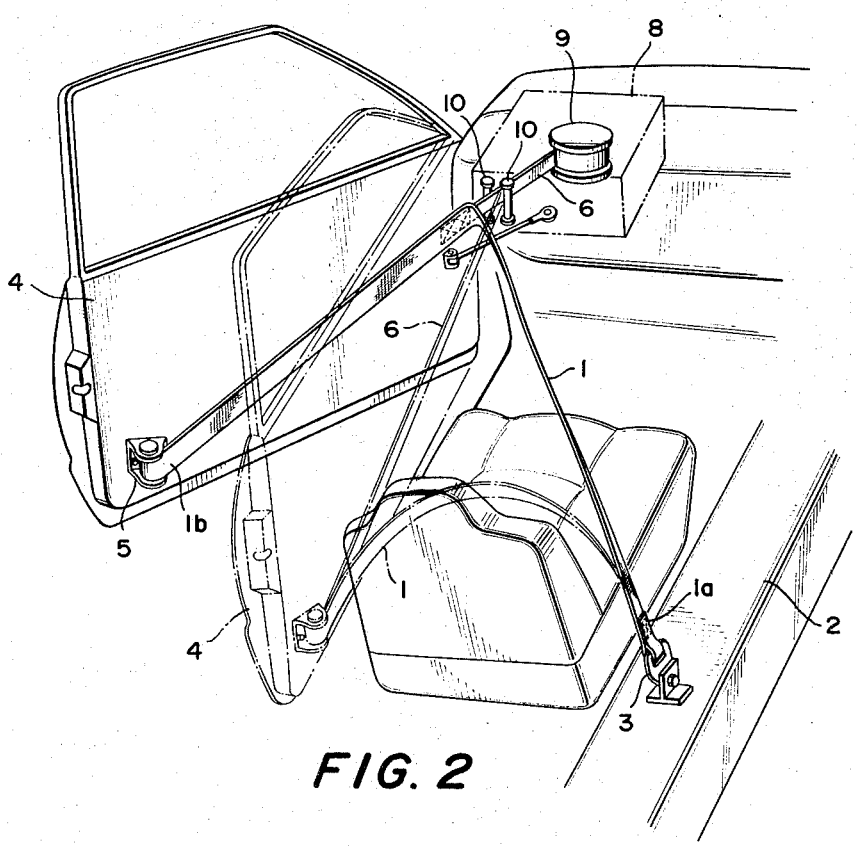
FIG. 2 is an illustrative view for explaining the operation of the belt.

An embodiment of the present invention will be described with reference to the drawings. FIG. 1 is a fragmentary perspective view of a vehicle equipped with the safety belt device of this invention, a door adjacent a driver's seat being in its opened position, a door adjacent an assistant driver's seat being in its closed position and a belt for the assistant driver's seat being in a position to restrain a passenger sitting on said seat. FIG. 2 is an illustrative view for explaining the operation of the belt, the phantom lines indicating the door in its closed position. With reference to FIGS. 1 and 2, reference numeral 1 designates a belt webbing having one end 1a thereof anchored to an anchor plate 3 fixed to the central portion 2 of the body of a vehicle, with the other end 1b connected to winding means 5 provided at the lower portion of a door 4. Reference numeral 6 designates a tape extending along the door 4, with one end adhesively bonded to the belt webbing 1 and the other end secured to a tape winding pulley 9 at the driving portion of a safety belt winding energy accumulator unit 8 which is mounted in the dash-board 7 of the vehicle and will be described later. Reference numeral 10 designates guide rollers for the tape 6 which are rotatably mounted on spindles fixed between base plates of the safety belt winding energy accumulator unit 8.

Figure 5:
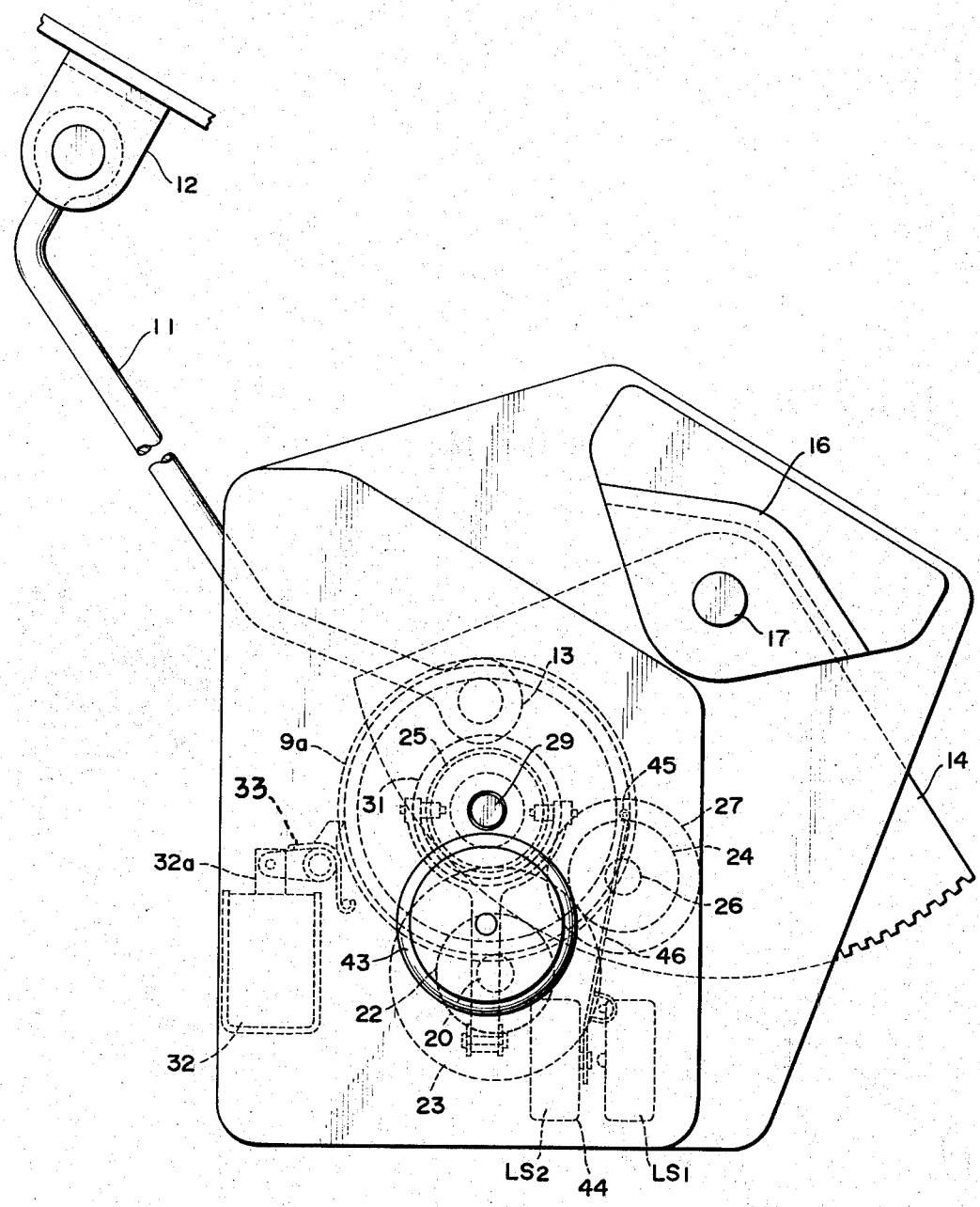
Figure 6:
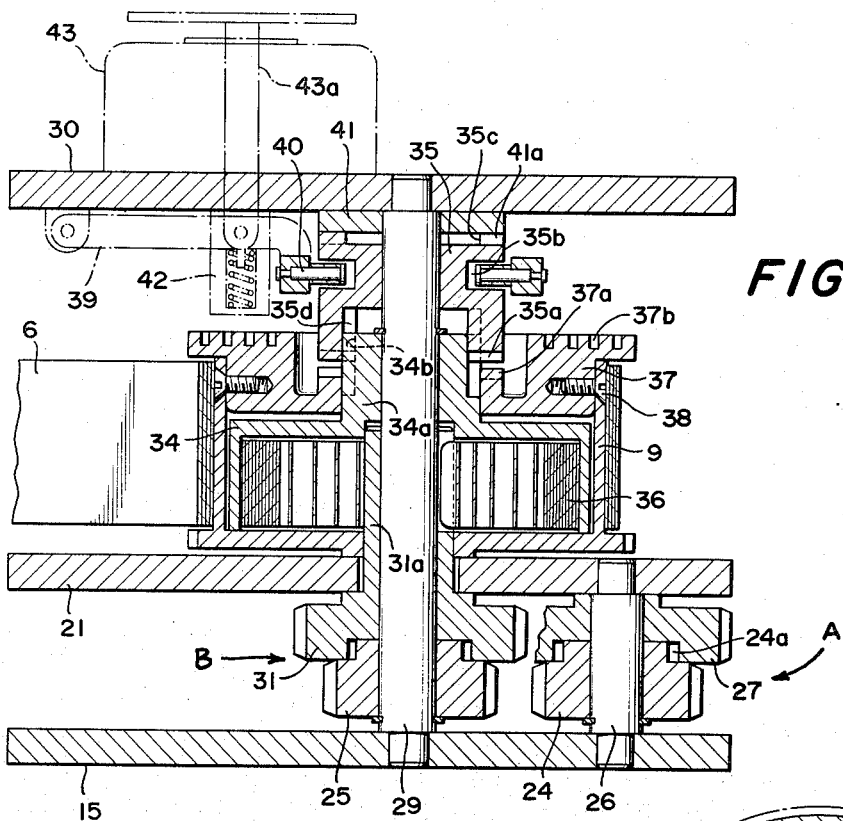
Figure 7:
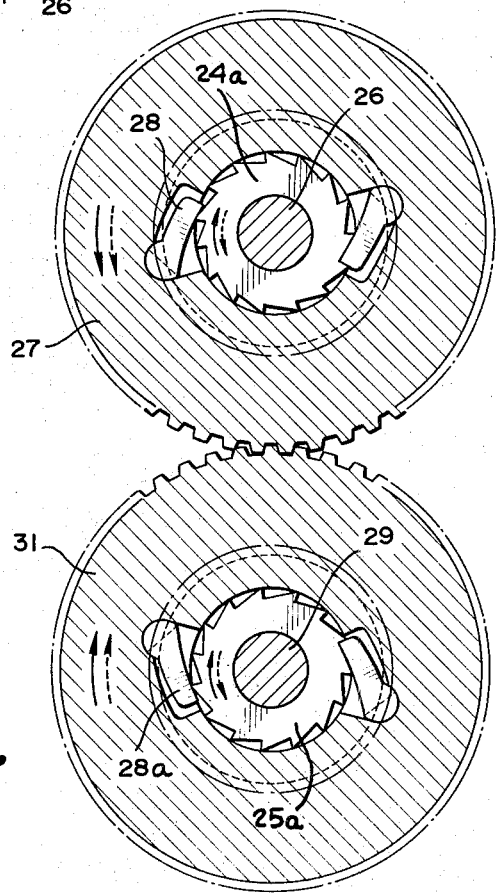
FIG. 7 is a plan view of the one-way clutch shown in FIGS. 5 and 6.
Figure 8:
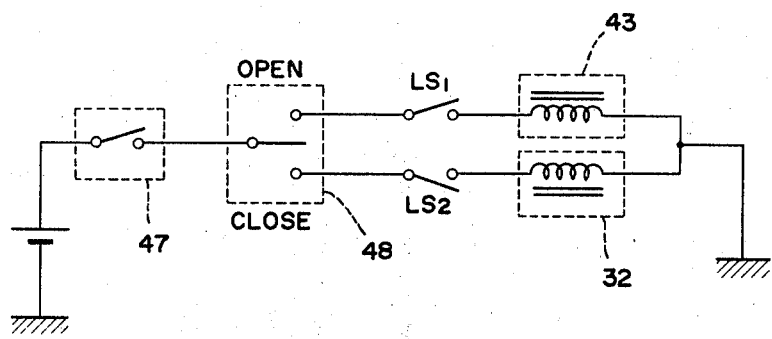
FIG. 8 is a wiring circuit diagram.

Now, one form of the safety belt winding energy accumulator unit 8 will be described. In FIGS. 3 and 4a, 4b reference numeral 11 designates a rod to transmit the opening or closing motion of the door 4 to the driving portion of the safety belt winding energy accumulator unit 8 mounted in the dash-board 7. One end of the rod 11 is connected to the door 4 through a joint 12 and the other end thereof is connected to a first sector gear 14 through a ball joint 13. This first gear 14, as shown in FIG. 4, is pivotally mounted at one end on a shaft 17 between the base plate 15 and a bracket 16, so that its toothed arcuate edge portion may be pivotally movable along oscillation preventing guides 19 provided on a bracket 18 and the base plate 15. Reference numeral 20 designates a shaft which has the opposite ends journaled in the bracket 18 and a base plate 21 respectively. On the shaft 20 is fixedly mounted a second gear 22 meshing with the first gear 14 and a third gear 23 for meshing engagement with one-way clutch bodies 24, 25 (FIGS. 5 and 6) to be described later. Turning now to FIGS. 5 through 7, reference numeral 26 designates a shaft journaled in the base plates 15, 21 and having one-way clutch bodies 24, 25 loosely mounted thereon, each of said clutch bodies 24, 27 having peripheral teeth for meshing engagement with the third gear 23. These one-way clutch bodies 24, 27 constitute a clutch mechanism A as shown in FIG. 6. Referring to FIGS. 6 and 7, the one-way clutch body 24 forms a ratchet 24a which is normally engaged by a pawl 28 provided in the one-way clutch 27. Reference numeral 29 designates a main shaft loosely extending through the base plate 21, with the opposite ends thereof journaled in the base plates 15, 30 respectively. On the main shaft 29 are loosely mounted the one-way clutch 25 having peripheral teeth for engagement with the third gear 23 and a one-way clutch 31 having peripheral teeth for engagement with the one-way clutch 27. The one-way cluth bodies 25, 31 constitute a clutch mechanism B similar to the clutch mechanism A. Namely, as shown in FIGS. 6 and 7, the one-way clutch body 25 forms a ratchet 25a and a pawl 28a provided in the one-way clutch body 31 is normally held in engagement with said ratchet 25a. Reference numeral 9 designates a tape winding pulley on which the tape 6 or a wire is wound as stated previously. The tape winding pulley 9 is open at one side and is formed at the other side with a ratchet 9a which is engaged by a reverse rotation preventing pawl 33 provided on the base plate 30 and connected to an operating rod 32a of a solenoid means 32. This tape winding pulley 9 is loosely mounted on a stem 31a of the one-way clutch body 31. Reference numeral 34 designates a casket disposed in the tape winding pulley 9 and accommodating a spiral spring 36 therein. This casket 34 is loosely mounted on the main shaft 29 at its stem 34a and has formed in the outer surface of its stem 34a slots 34b for engagement with projections of a clutch 35 to be described later. The outer end of the spiral spring 36 is anchored to the inner end of the casket 34 through an excess winding preventing mechanism, while the inner end thereof is anchored to the stem 31a of the one-way clutch 31. Reference numeral 37 designates a pulley ratchet partially received in the open side of the tape winding pulley 9, with the outer surface secured to the inner surface of said pulley 9 by means of screws 38 and the inner surface thereof in loose engagement with the stem 34a of the casket 34. This pulley ratchet 37 is formed with pawls 37a for engagement with the clutch 35 and also with a spiral groove 37b in the upper surface thereof. The clutch 35 is loosely mounted on the main shaft 29, with the latter extending through an axial hole thereof and is formed at its lower side with pawls 35a for engagement with the pawls 37a of the pulley ratchet 37. The pawls 37a of the pulley ratchet 37 and the pawls 35a of the clutch 35 constitute an intermittent motion clutch for the tape winding pulley. The clutch 35 is formed at it intermediate portion with a groove 35b for receiving rollers 40 carried on a clutch arm 39 to be described later, and also formed at its upper side with pawls 35c for engagement with pawls 41a of a clutch 41 fixed to the base plate 30. The pawls 41a of the clutch 41 and the pawls 35c of the clutch 35 constitute a clutch mechanism for fixing and releasing the casket 34. Further, the clutch 35 is formed on the inner surface thereof with projections 35d for engagement with the slots 34b formed in the stem 34a of the casket 34. The clutch arm 39 is pivotably supported on the base plate 30 through a clutch arm holder 42 and connected to an operating rod 43a of solenoid means 43 which is fixed to the base plate 30, with the latter received in a groove formed in an intermediate portion thereof. Also fixed to the base plate 30 is a spring holder having disposed therein a spring by which the clutch arm 39 is urged upwardly. Reference numeral 44 designates a switch fixed to the base plate 30. This switch 44 is provided with an actuator lever 46 having an actuator 45 which is slidably received in the groove 37b of the pulley ratchet 37 to detect the rotation of said pulley ratchet 37.

The safety belt winding energy accumulator unit constructed as described above will operate in the following manner:

Namely, when the door 4 is opened, the opening motion of the door is transmitted through the connecting rod 11 to the first gear 14, causing said first gear 14 to rotate in a clockwise direction about the shaft 17, which in turn causes the second gear 22 to rotate in a counterclockwise direction about the shaft 20. Therefore, the third gear 23, fixedly mounted on the shaft 20, also rotates in a counterclockwise direction together with the second gear 22, and hence the one-way clutch bodies 24, 25 meshing with the third gear 23 rotate in a clockwise direction respectively. When the one-way clutch body 25 rotates in the clockwise direction, the ratchet 25a of said one-way clutch body 25 is brought into engagement with the pawls 28a formed in the one-way clutch 31 and, by this clutch action, said one-way clutch body 31 rotates in a clockwise direction together with the one-way clutch body 25 while winding the spiral spring 36 fixed to the stem 31a of said one-way clutch body 31. In this case, since the one-way clutch bodies 24 and 27 are rotating in the opposite directions to each other due to the clutch action, the one-way clutch body 27 rotates in a counterclockwise direction incident to the rotation of the one-way clutch body 31.

On the other hand, when the door 4 is closed, the closing motion of said door is transmitted through the connecting rod 11 to the first gear 14 to cause said first gear 14 to rotate in a counterclockwise direction, so that the second gear 22 and third gear 23 rotate in a clockwise direction respectively and the one-way clutch bodies 24, 25 rotate in a counterclockwise direction respectively. In this case, the one-way clutch body 27 rotates in the same direction as the one-way clutch body 24 as a result of clutch action and the one-way clutch bodies 25 and 31 rotate in the opposite directions to each other as a result of clutch action. Therefore, the one-way clutch body 31 rotates in a clockwise direction incident to the rotation of the one-way clutch body 27 while winding the spiral spring 36 fixed to the stem 31a of the one-way clutch body 27.

Thus, the one-way clutch body 31 rotates always in a clockwise direction in either case when the door 4 is opened or closed, and hence the spiral spring 36 is always wound up.

Now, the tape winding and unwinding operation will be described. When the solenoid means 43 is in the de-energized state, the clutch 35 cannot rotate in a clockwise direction as it is meshing with the clutch 41 fixed to the base plate 30, through the rollers 40 of the clutch arm 39 which is urged upwardly by the spring. The casket 34 cannot rotate in a clockwise direction either, because the projections 35d of the clutch 35 are engaged in the slots 34b formed in the stem 34a of said casket. In this case, while the clutch 35 and the tape winding pulley 9 are out of engagement with each other, the tape winding pulley is not rotatable in a counterclockwise direction since the ratchet 9a formed along the periphery of said tape winding pulley 9 is engaged by the pawl 33 connected to the operating rod 32a of the solenoid means 32.

The passenger when getting out of the automobile opens the door 4 while sitting on the seat, so that the door switch 48 is opened, with the seat switch being held in its on-position, and the solenoid means 43 is excited. With the solenoid means 43 excited, its operating rod 43a depresses the central portion of the clutch arm 39, releasing the engagement between the clutches 35 and 41 and concurrently bringing the pawls 35a of said clutch 35 into meshing engagement with the pawls 37a of the pulley ratchet 37. Further, concurrently with disengagement of the clutch 35 from the clutch 41, the casket 34 rotates in a clockwise direction, causing the tape winding pulley 9 to rotate through the clutch 35 while winding the tape 6 or the wire. After a predetermined length of the tape or wire has thus been wound up, a switch $LS_1$ is opened and the solenoid means 43 is deenergized. By the tape winding operation, the belt 1 is also cleared from the seat and will not interfere with the passenger alighting from the automobile.

In the case when the passenger gets into the automobile, the passenger sits on the seat and then closes the door 4, so that the seat switch 47 is closed and the door switch 48 is also closed, with the result that the solenoid means 32 is excited. Upon excitation of the solenoid means 32, the pawl 33 is released from engagement with the ratchet 9a by the action of the operating rod 32a, so that the tape winding pulley 9 is set free, allowing the winding means 5 provided at the lower portion of the door 4 to wind the tape 6 and belt 1. Thus, the tape 6 is completely unwound from the tape winding pulley 9 which is rotated in a counterclockwise direction by said tape and the belt 1 is placed in its engaging position to restrain the passenger's body.

The number of revolutions of the tape winding pulley 9 in this case is detected by the detector switch 44 by way of its actuator 46 having one end 45 in engagement with the pulley ratchet 37.

Although the safety belt device described above is operated mechanically, it may alternatively be operated electrically. Namely, according to another embodiment of the invention shown in FIG. 9, an arrangement is made such that the spiral spring is wound by a motor and not by the opening or closing motion of the door as in the preceding embodiment, the other construction and function of this embodiment being the same as the preceding embodiment.

Figure 9:
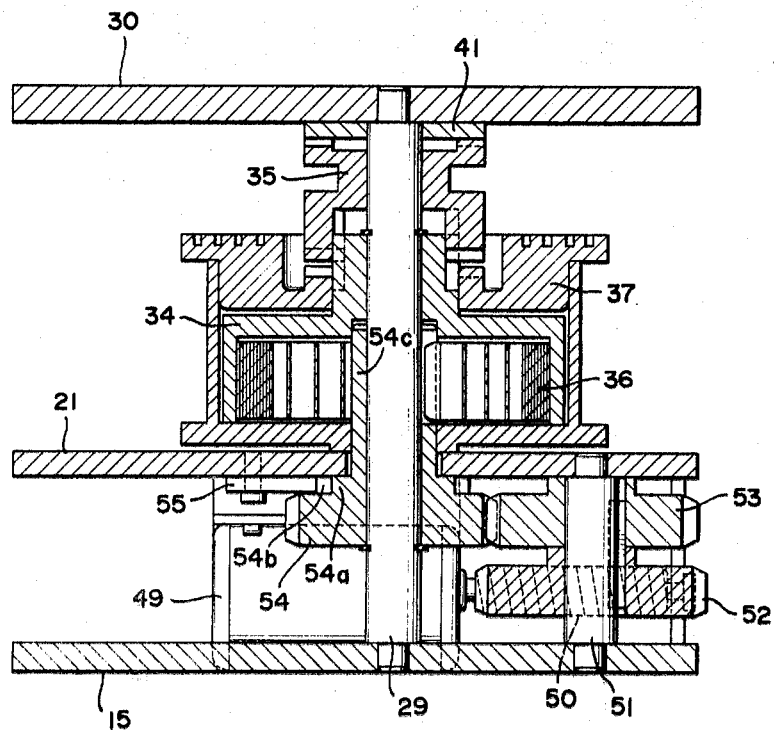
FIG. 9 is a sectional view of another form of the energy accumulator unit.

In FIG. 9, reference numeral 49 designates a miniature motor having a worm 50 mounted on a drive shaft thereof. This motor 49 is fixedly mounted on the base plate 21. Reference numeral 51 designates a shaft having the opposite ends journaled in the base plates 15, 21 respectively. A worm wheel 52 meshing with the worm 50 of the motor 49 and a gear 53 are fixedly mounted on the shaft 51. Reference numeral 54 designates a gear loosely mounted on the main shaft 29 in meshing engagement with the gear 53. This gear 54 is provided with reverse rotation preventing pawls 54b at the root portion 54a of a stem thereof and has the inner end of the spiral spring 36 fixed to an end portion 54c of said stem. Reference numeral 55 designates a reverse rotation preventing ratchet to be engaged by the pawls 54b of the gear 54, which is pivoted to the base plate 21. Though not apparent, a switch is provided adjacent the spiral spring 36, which controls the motor 49 upon detecting the amount of winding of the spiral spring 36. The other construction is the same as in the first embodiment. The embodiment of the construction described above operates in the following manner: Namely, when the motor 49 is set in motion upon actuation of the control switch (not shown) into its closed position, the worm wheel 52 rotates in a counterclockwise direction and the gear 53 coaxial with said worm wheel also rotates in the same direction. Thus, the gear 54 meshing with the gear 53 rotates in a clockwise direction incident to the rotation of said gear 53, winding the spiral spring 36 fixed to the end portion 54c of the stem of said gear 54. When the amount of winding of the spiral spring 36 has reached a predetermined value, the motor control switch is opened and the motor 49 stops rotating. In this case, a reverse rotation of the gear 54 by the unwinding force of the spiral spring 36 is prevented by the ratchet 55.

As may be understood from the description herein, the safety belt device according to the present invention comprises an energy accumulator unit which is so designed that a safety belt drawing energy is accumulated in a spiral spring fixed to and being wound up by a transmission shaft which is driven incident to the operation of the door or by a motor, and is released through a clutch to a safety belt drawing pulley to draw up the safety belt. Therefore, the safety belt device of the invention has the advantages that it automatically restrains the body of a passenger by the safety belt whenever the passenger sits on the seat, even if the passenger inadvertently fails to tighten the safety belt around the body or does not wish to take the trouble of such operation, and that the safety belt does not interfere with the passenger getting in or out of the vehicle equipped with the safety belt device, as the safety belt is cleared from the way of the passenger on such occasion by the energy accumulator unit.

We claim:

1. A safety belt device for use in a vehicle including a door, which comprises a belt webbing having one end secured to a body of the vehicle on one side of a seat and the other end engaged to a winding means on the other side of the seat, said belt webbing extending across the seat in both first and second positions, said first position being an occupant restraining position when the door is closed and said second position being an occupant nonrestraining position when the door is open; an energy accumulator means for displacing said belt webbing to said second position; and a connecting means having one end bonded to said belt webbing and the other end engaged to said energy accumulator means, said energy accumulator means including a rod means having one end connected to the door of the vehicle and the other end connected to a first sector gear pivotally mounted on a first shaft, a second gear engaging with said first gear and fixed to a third gear in axial relationship to the latter; one-way clutch bodies mounted on said first gear for engaging with the third gear, and means energized by the winding of a spiral spring secured at one end to a second shaft by angular movement of said first gear through the rod means.

2. A safety belt device for use in a vehicle according to claim 1, wherein said connecting means is a tape.

3. A safety belt device for use in a vehicle according to claim 1, wherein said connecting means is a wire.

4. A safety belt device for use in a vehicle according to claim 1, wherein said energy accumulator means is mounted on a dashboard of the vehicle.

* * * * *